United States Patent
Schaper et al.

(10) Patent No.: US 9,300,126 B2
(45) Date of Patent: Mar. 29, 2016

(54) ELECTRICAL APPARATUS FOR THE SHORT-CIRCUIT PROTECTION OF A THREE-PHASE LOAD IN A THREE-PHASE SYSTEM

(75) Inventors: Elmar Schaper, Luegde (DE); Rainer Durth, Horn-Bad Meinberg (DE); Lutz Heuer, Blomberg (DE); Bernd Schulz, Steinheim (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 367 days.

(21) Appl. No.: 14/005,182

(22) PCT Filed: Mar. 15, 2012

(86) PCT No.: PCT/EP2012/054553
§ 371 (c)(1),
(2), (4) Date: Nov. 18, 2013

(87) PCT Pub. No.: WO2012/123541
PCT Pub. Date: Sep. 20, 2012

(65) Prior Publication Data
US 2014/0071574 A1    Mar. 13, 2014

(30) Foreign Application Priority Data
Mar. 16, 2011 (DE) .......... 10 2011 001 340

(51) Int. Cl.
*H02H 3/00* (2006.01)
*H02H 7/00* (2006.01)
(Continued)

(52) U.S. Cl.
CPC ............... *H02H 3/083* (2013.01); *H02H 3/023* (2013.01)

(58) Field of Classification Search
CPC ............................ H02H 3/087; H01L 2924/00
USPC ............................................................ 361/100
See application file for complete search history.

(56) References Cited

U.S. PATENT DOCUMENTS 3,619,721 A * 11/1971 Westendorp ............. H02H 7/16
361/16
3,621,274 A  11/1971 Plond
(Continued)

FOREIGN PATENT DOCUMENTS

| CN | 1825729 A | 8/2006 |
| CN | 200986907 Y | 12/2007 |

(Continued)

OTHER PUBLICATIONS

English Translation of International Search Report dated Jun. 29, 2012 corresponding to International Patent Application No. PCT/EP2012/054553, 3 pp.
(Continued)

*Primary Examiner* — Dharti Patel
(74) *Attorney, Agent, or Firm* — Ohlandt, Greeley, Ruggiero & Perle, LLP

(57) ABSTRACT

An apparatus for short-circuit protection of a three-phase load in a three-phase system includes an input for connection of the apparatus to a three-phase network, an output for connection of the three-phase load to the apparatus, a means for producing an auxiliary short circuit in the three-phase network by ignition of the means, a means for identifying a short circuit at the three-phase load, and a means for generating an ignition pulse upon identification of the short circuit. The means for producing the auxiliary short circuit and the means for identifying the short circuit are provided in the current path between the input and the output. The means for producing the auxiliary short circuit is ignitable by the ignition pulse. The means for generating the ignition pulse is formed so that the ignition pulse can be generated by a short-circuit current established by the means for identifying the short circuit.

9 Claims, 4 Drawing Sheets

(51) Int. Cl.
*H02H 3/08* (2006.01)
*H02H 3/02* (2006.01)
*H02H 9/02* (2006.01)

(56) References Cited

U.S. PATENT DOCUMENTS

| | | | |
|---|---|---|---|
| 3,979,645 A | 9/1976 | Wittenzellner | |
| 6,750,576 B2* | 6/2004 | Ehrhart | H02H 3/023 310/68 E |
| 7,035,066 B2 | 4/2006 | McMahon et al. | |
| 2007/0159743 A1* | 7/2007 | Flores Losada | H02H 7/04 361/54 |

FOREIGN PATENT DOCUMENTS

| | | |
|---|---|---|
| DE | 473336 C | 3/1929 |
| DE | 824812 C | 12/1951 |
| DE | 1805207 U | 2/1960 |
| DE | 2111154 A1 | 10/1971 |
| DE | 2947700 A1 | 7/1981 |
| DE | 4040359 | 7/1992 |
| DE | 4040359 A1 | 7/1992 |
| DE | 4235329 A1 | 4/1994 |
| DE | 10313045 B3 | 7/2004 |
| JP | S53141446 | 12/1978 |
| JP | S605734 | 1/1985 |
| JP | H05176445 A | 7/1993 |
| JP | 2001505758 A | 4/2001 |
| JP | 2006512037 A | 4/2006 |

OTHER PUBLICATIONS

Japanese Office Action dated Oct. 14, 2014 for corresponding Japanese Patent Application No. JP2013-558435 with English translation, 9 pages.
English Translation of the Written Opinion of the International Searching Authority dated Jun. 29, 2012 corresponding to International Patent Application No. PCT/EP2012/054553, 5 pp.
Chinese Office Action dated Dec. 2, 2014 for corresponding Chinese Patent Application No. 201280007695.5 with English translation, 19 pages.
English Translation of the International Preliminary Report on Patentability dated Sep. 17, 2013 corresponding to International Patent Application No. PCT/EP2012/054553, 6 pp.
Russian Office Action dated Oct. 23, 2014 for corresponding Russian Patent Application No. 2013139675 with English translation, 6 pages.
German Office Action dated Jun. 12, 2013 for corresponding German Patent Application No. 10 2011 001 340.7, 9 pages.
Office Action dated Aug. 6, 2015 for corresponding Chinese Patent Application No. 201280007695.5 with English translation, 2 pages.

* cited by examiner

ELECTRICAL APPARATUS FOR THE SHORT-CIRCUIT PROTECTION OF A THREE-PHASE LOAD IN A THREE-PHASE SYSTEM

The relation relates to an apparatus for the short-circuit protection of a three-phase load in a three-phase system, to a semiconductor switchgear protection device comprising the aforementioned apparatus, and also to a method for improving the short-circuit protection of a three-phase load in a three-phase system.

In three-phase systems, also referred to as three-phase alternating current systems or mains applications, a short-circuit protection for a three-phase load operated on the three-phase system, such as a motor, a heating element or a lamp, which is connected to the three-phase network in many cases via a switchgear, such as a frequency convertor, a contactor or a semiconductor motor switchgear, is necessary for electrical safety reasons. For example, current-limiting switching elements, such as fuses or circuit breakers, can be used for the short-circuit protection.

Key parameters for the dimensioning of switching elements of this type are the cut-off current, that is to say the peak value of the current that flows before the three-phase load is disconnected, and also the necessary tripping energy for the switching element, for example the melting integral of a fuse, that is to say the energy that is necessary to cause the disconnection by means of the switching element. The load-specific dimensioning of both aforementioned characteristics is dependent on the connected loads of the three-phase network, the switching element, the connected impedance that is effective in spite of short circuit due to present network and/or line impedances, and also on further elements that have to conduct the short-circuit current.

In the case of current-limiting switching elements, there is often the problem that the permissible parameters of a switchgear connected downstream, such as a contactor or a motor switchgear, could be exceeded and therefore smaller fuses have to be selected. However, in applications with high peak currents owing to the principles involved, for example in the case of starting currents of motors, this leads to a design conflict. In addition, many current-limiting switching elements known from the prior art can indeed quickly disconnect high short-circuit currents, but act too slowly in the case of relatively small short-circuit currents, and therefore excessively large currents may flow through the downstream loads and could cause damage in the connected motors or heating elements.

The solution approaches known from the prior art for the aforementioned problems are based on the concept of achieving the best possible match between the current-limiting switching element, the three-phase network and the load. In this regard, a distinction is made in accordance with Standard IEC 60947-4-1 within the scope of short-circuit protection between two classification types, which describe the permissible level of damage of a device or of a load after a short circuit. In classification type 1, downstream devices, such as contactors or semiconductor switchgears, can be destroyed if they pose no risk, such as fire, or if no risk is posed by open live parts. In classification type 2, the downstream devices have to remain functional however, wherein user intervention may be necessary, such as the breaking of switching contacts using simple tools. Here, a curtailment of the service life of the downstream device or load is permissible, which means that the short-circuit situation may not occur arbitrarily. Whereas mechanical switchgears, such as contactors, are often assigned to classification type 2, classification type 1 is usually applicable for semiconductor switchgears, for example for motors.

The solution approaches known from the prior art for the aforementioned problems are also based on the concept of either disconnecting the short-circuit current as quickly as possible, such that no damage is sustained in the downstream device or load, or limiting the harmful short-circuit current, for example by means of series resistors, to such an extent that critical parameters of the downstream device or load are not exceeded, or alternatively designing the switchgear so as to be accordingly overdimensioned. All of these approaches have the disadvantage however that they have to be implemented very specifically in accordance with the downstream device or load and therefore cannot be used universally.

The object of the invention is therefore to provide an apparatus, with which it is possible to classify devices or loads of classification type 1 into classification type 2 without resulting in any technical limitations of the short-circuit protection for the device or the load. In particular, the object of the invention is to provide an apparatus that, independently of the type of device or load to be protected, provides a short-circuit protection for the device or the load without destruction of the device or the load in the event of a short circuit.

The object is achieved in accordance with the invention by the features in the independent claims. Advantageous embodiments of the invention are specified in the dependent claims.

The object is therefore achieved by an apparatus for the short-circuit protection of a three-phase load in a three-phase system, said apparatus comprising an input for connection of the apparatus to a three-phase network, an output for connection of the three-phase load to the apparatus, a means for producing an auxiliary short circuit in the three-phase network by ignition of the means, a means for identifying a short circuit at the three-phase load, and a means for generating an ignition pulse upon identification of the short circuit, wherein the means for producing the auxiliary short circuit and the means for identifying the short circuit are provided in the current path between the input and the output, and the means for producing the auxiliary short circuit are ignitable by the ignition pulse.

In accordance with the invention, in the case of a short circuit and/or earth fault after the apparatus, that is to say for example in the event of a short circuit in the three-phase load, what is known as an auxiliary short circuit in the form of a "bypass" is thus created by the apparatus, and therefore a short-circuit current, which is harmful for the three-phase load, no longer flows through the three-phase load or through a switchgear connected upstream of the three-phase load, but is disconnected due to the bypass created by a short-circuit protection device known from the prior art, such as a fuse or a circuit breaker, which can be provided between the three-phase network and the apparatus. Here, the bypass or the auxiliary short circuit may be implemented for example as a short circuit between two phases of the three-phase network, and therefore the short-circuit protection device then interrupts the connection between the three-phase load and the three-phase network.

The apparatus according to the invention therefore also makes it possible in a particularly simple manner for semiconductor-based motor switchgears, for which classification type 1 was previously appropriate, to also achieve classification type 2 as a result of connection via the apparatus to the three-phase network, that is to say that said switchgears, by comparison with the solutions known from the prior art, no longer have to be destroyed in the event of a short circuit.

Since the means for producing the auxiliary short circuit creates a bypass, the three-phase load connectable to the output remains intact in the event of a short circuit, since the short-circuit current no longer flows through the three-phase load, but through the bypass. The apparatus thus constitutes, in a particularly advantageous manner, a protection device protecting a three-phase load against destruction by a short-circuit current, wherein the means for identifying the short circuit, in the event of a short circuit, detects the short circuit, and, upon detection of the short circuit, the means for generating the ignition pulse then ignites, by means of the ignition pulse, the ignitable means for producing the auxiliary short circuit in such a way that a bypass, that is to say a short circuit or an auxiliary short circuit, is fed on the input side from the apparatus into the three-phase network, such that an upstream short-circuit protection device trips and interrupts the energy supply of the apparatus and therefore also of the three-phase load connected to the apparatus.

In principle, the means for producing the auxiliary short circuit, for identifying the short circuit and/or for generating an ignition pulse can be embodied arbitrarily. In accordance with a development of the invention however, it is particularly preferable for the means for producing the auxiliary short circuit to comprise an ignition input, a coupling element and an ignitable arc gap, wherein the ignition input, the coupling element and the arc gap are embodied in such a way that an ignition voltage in the form of an ignition pulse that can be applied to the ignition input acts via the coupling element on the arc gap in order to ignite an arc, and the arc gap is preferably embodied in such a way that the auxiliary short circuit can be produced by the arc between at least two phases of the three-phase network. Here, the ignition voltage triggering the ignition pulse is preferably a voltage transient, which is applied to the ignition input in order to produce the auxiliary short circuit, wherein the coupling element and the arc gap are preferably dimensioned in such a way that an arc is produced even with relatively small voltages and short-circuits the three-phase network. Due to the arc, the short-circuit current of the main current path commutates to the produced arc and no longer runs in the three-phase load. Due to the commutation, a bypass is thus created for the short-circuit current, and therefore a three-phase load connected to the apparatus can no longer be damaged by the short-circuit current. Since an arc of this type in principle can be loaded arbitrarily with a short-circuit current, although the short-circuit current leads to considerable power losses in the arc gap, a short-circuit protection device arranged upstream of the apparatus is preferably provided and, in the event of an arc, interrupts the connection between the apparatus and the three-phase network.

In this regard, it is also preferable for each phase of the three-phase network to have two coupling elements and one arc gap, for a first coupling element for each phase to be connected between the respective phase and the ignition input in such a way that all first coupling elements are connected together at the ignition input in a star-shaped manner, for a second coupling element for each phase to be connected between an input, assigned to the respective phase for ignition of the respective arc gap, and the ignition input in such a way that all second coupling elements are connected together at the ignition input in a star-shaped manner, and for the respective arc gaps between the respective phase and a respective other phase or an earthing to be connected such that an ignition voltage applied to the ignition input between the first coupling elements connected together in a star-shaped manner and the second coupling elements connected together in a star-shaped manner drops.

In accordance with a preferred development of the invention, the means for identifying the short circuit comprises a current sensor and a means for identifying a switching threshold, the current sensor is arranged in the current path of a phase of the three-phase network, the means for identifying the switching threshold cooperates with the current sensor, and the means for identifying the switching threshold is embodied in such a way that, if a predefined switching threshold is exceeded, the identification of a short circuit is signalled to the means for generating the ignition pulse. The current sensor is preferably formed as a shunt resistor, as a PTC, as a Hall sensor or as a Rogowski coil. In this regard, each phase of the three-phase network further comprises a respective current sensor and a respective means for identifying a switching threshold, and all means for identifying the respective switching thresholds are connected together on the output side via an OR link in such a way that, if the switching threshold is exceeded at just one phase, the identification of a short circuit is signalled to the means for generating the ignition pulse. As a switching threshold, a short-circuit current value is preferably defined and for example may be ten times to twenty times the nominal current. If this short-circuit current value is exceeded, the means for identifying the switching threshold value signals to the means for generating the ignition pulse that the means for producing the auxiliary short circuit is to be ignited by the ignition pulse. It is also preferable for the means for identifying the switching threshold to comprise a galvanic isolation device.

In accordance with a preferred development of the invention, the means for generating the ignition pulse further comprises a coil, wherein the coil is connected in a switchable manner to an energy source in such a way that the ignition pulse can be generated by interrupting the application of energy to the coil. It is therefore preferable for the voltage induced in the coil to be used as ignition energy for igniting the means for producing the auxiliary short circuit. Here, the energy source is preferably formed as an auxiliary voltage source, which drives a current through the coil, wherein a resistor can be provided in the current path of the coil for this purpose. This current can be interrupted for example by means of a transistor. Here, it is also preferable for the energy stored in the coil to be guided to the ignition input as an ignition pulse. In accordance with an alternative embodiment, it is preferable for the means for generating the switching pulse to be embodied in such a way that the ignition pulse can be generated by a short-circuit current established by the means for identifying the short circuit. It is therefore preferable for the ignition energy for the generation of the ignition pulse to be drawn from the short-circuit current, that is to say the short-circuit current may therefore replace the auxiliary voltage source. In a further embodiment, a transformer circuit may be provided, by means of which the ignition pulse can be generated. It is likewise possible to provide a capacitor that can be pre-charged to a high voltage value, such that the capacitively stored energy can be used as ignition energy.

The object of the invention is also achieved by a semiconductor switchgear protection device, comprising an apparatus as described previously and also a semiconductor switching device, wherein the semiconductor switching device is provided at the output of the apparatus and is designed for connection to the three-phase load. Due to an embodiment of this type, it is possible that, in the event of a short circuit, the short-circuit current does not damage the semiconductor switching device, but the short-circuit current flows through the auxiliary short circuit created by the apparatus and thus trips a short-circuit protection device preferably arranged upstream of the apparatus, such that the apparatus is no longer connected to the three-phase source. Due to a solution of this type, substantial progress is made compared to the prior art, since the semiconductor switching device is no longer destroyed in the event of a short circuit by the short-circuit current.

Further embodiments and advantages of the semiconductor switchgear protection device according to the invention will become clear to a person skilled in the art by analogy with the above-mentioned embodiments of the apparatus.

The object of the invention is also achieved by a method for improving the short-circuit protection of a three-phase load in a three-phase system, said method comprising the following steps: a) identifying a short circuit at the three-phase load, b) generating an ignition pulse upon identification of the short circuit, and c) generating an auxiliary short circuit in the three-phase system by a means ignitable by the ignition pulse.

Further embodiments and advantages of the method according to the invention will become clear to a person skilled in the art by analogy with the above-mentioned embodiments of the apparatus.

The invention will be explained in greater detail hereinafter with reference to the accompanying drawing on the basis of preferred embodiments.

In the figures:

FIG. 1 shows a schematic view of an exemplary application of an apparatus according to the invention for the short-circuit protection of a three-phase load 1.

Figure 1:
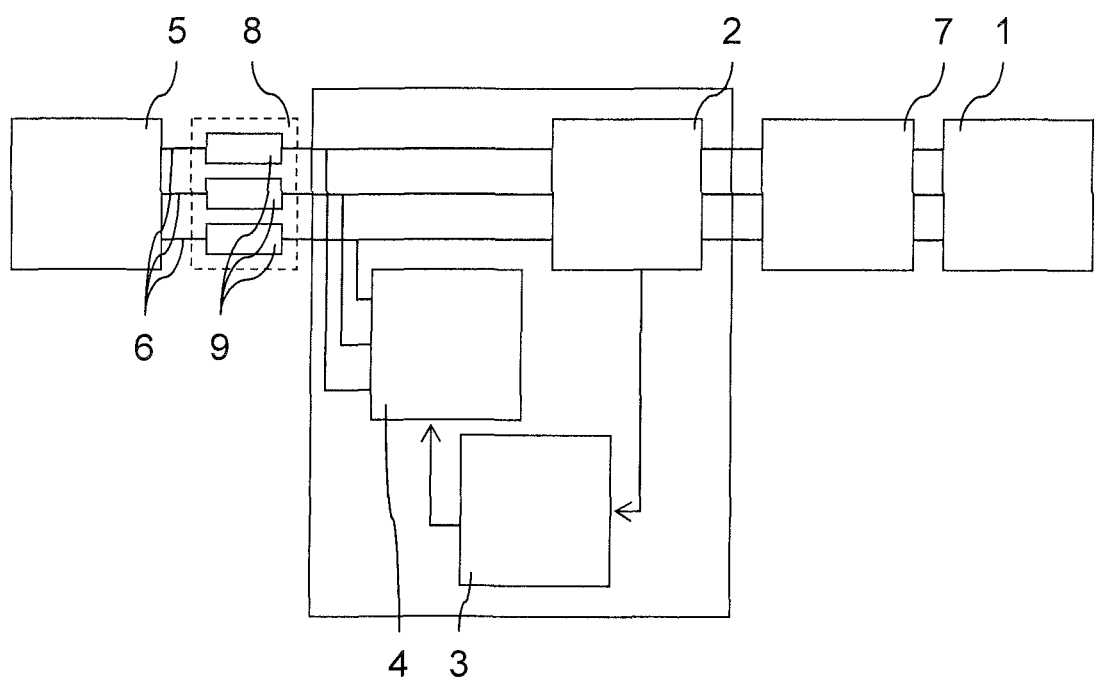
FIG. 1 shows a schematic view of an apparatus according to the invention.

The apparatus comprises a means for identifying a short circuit 2 at the three-phase load 1, a means for generating an ignition pulse 3 upon identification of the short circuit, and also a means for producing an auxiliary short circuit 4. The apparatus 2, 3, 4 is connected to a three-phase network 5. If the means for identifying the short circuit 2 detects a short circuit at the three-phase load 1, the means 2 signals the detected short circuit to the means for generating an ignition pulse 3. The means for generating an ignition pulse 3 generates the ignition pulse, as a result of which the means for producing the auxiliary short circuit 4 ignites and produces an auxiliary short circuit in the three-phase network 5.

Before the three-phase load 1, a switchgear 7, for example a frequency convertor, a contactor or a semiconductor motor switchgear, is provided and is thus arranged between the means for identifying the short circuit 2 and the three-phase load 1, for example a motor. A short-circuit current device 8 is provided between the three-phase network 5 and the apparatus 2, 3, 4 and comprises a fuse 9 or a circuit breaker in each phase 6 of the three-phase network 5.

In accordance with the invention, in the event of a short circuit and/or earth fault after the apparatus 2, 3, 4, that is to say for example in the switchgear 7 or in the three-phase load 1, an auxiliary short circuit in the form of a "bypass" is now created by the apparatus 2, 3, 4, such that the short-circuit current no longer flows through the switchgear 7 and/or through the three-phase load 1, but flows between at least two phases 6 due to the auxiliary short-circuit, and therefore the short-circuit protection device 8 interrupts the connection between the three-phase network 5, that is to say the energy supply, and the apparatus 2, 3, 5, and therefore for the switchgear 7 and the three-phase load 1.

Figure 2:
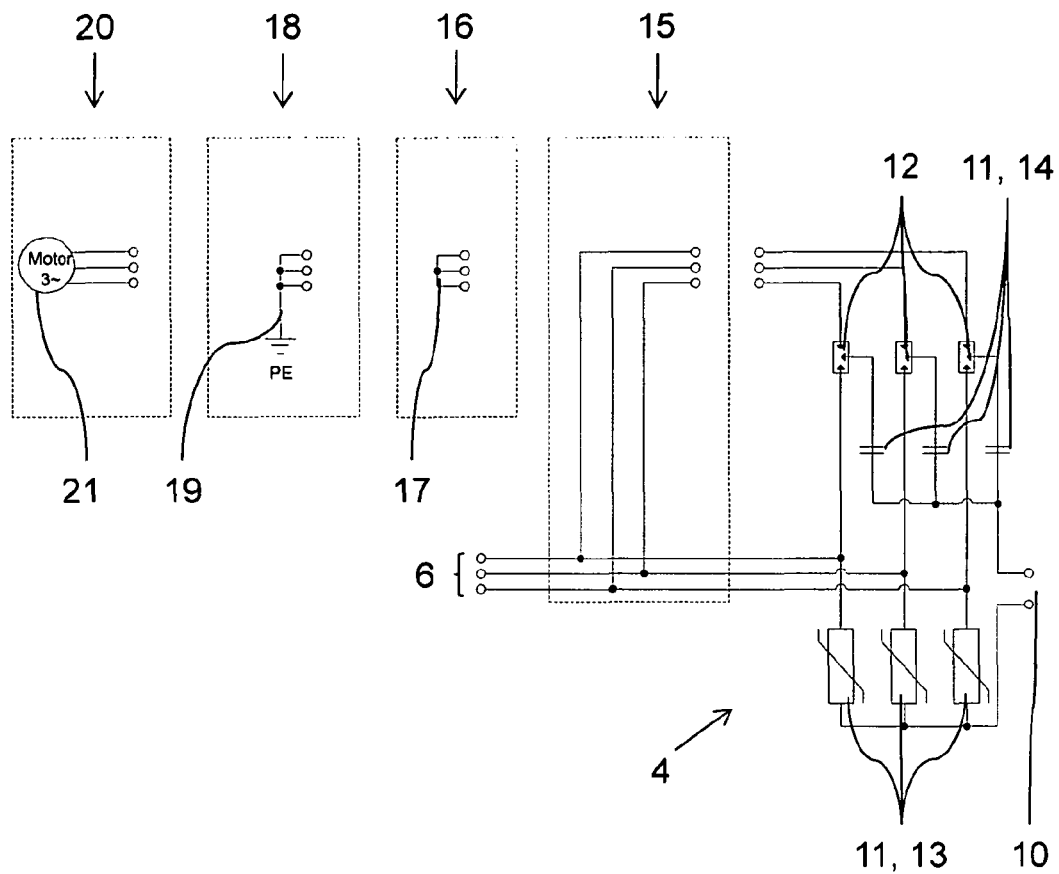
FIG. 2 shows a schematic view of a means according to the invention for producing an auxiliary short circuit.

FIG. 2 shows an exemplary embodiment of the means for producing the auxiliary short circuit 4. The means 4 comprises an ignition input 10, wherein, by applying an ignition voltage to the ignition input 10, the means 4 is ignited, such that the means 4 produces the auxiliary short circuit in the three-phase network 5. To this end, the means 4 further comprises a coupling element 11, which is formed in the present case as a varistor and capacitor. An arc gap 12 is also provided and can be formed as a surge protector or air spark gap.

As can also be seen from FIG. 2, 2 coupling elements 11 and one arc gap 12 are provided per phase 6 of the three-phase network 5, wherein the first coupling elements 11, 13 and the second coupling elements 11, 14 are connected together in a star-shaped manner, wherein an ignition voltage can be applied to the ignition input 10 between the first coupling elements 11, 13 connected together in such a star-shaped manner and the second coupling elements 11, 14 connected together in such a star-shaped manner. The second coupling elements 11, 14, as can be seen from FIG. 2, are also, per phase 6, each connected to the arc gap 12 in such a way that, by applying the ignition voltage to the ignition input 10, the arc gap 12 ignites in order to generate an arc.

Due to the arc gap, an auxiliary short circuit is produced between the phases 6 in a first embodiment 15, indicated by reference sign. In a second embodiment 16, indicated by reference sign 16, the auxiliary short circuit can be displaced to a star point 17, or in a third embodiment 18, as indicated by reference sign 18, can be displaced to an earthed star point 19. In a fourth embodiment 20, it is possible for the auxiliary short circuit, as indicated by reference sign 20, to be displaced to a motor 21. Here, the dashed boxes 15, 16, 18, 20, which are assigned to the respective embodiment 15, 16, 18, 20, are each connected to the means 4 via the phases L1, L2, L3. In each embodiment 15, 16, 18, 29, the application of the ignition voltage to the ignition input 10, for example the application of a voltage transient, causes the ignition voltage to be coupled via the coupling elements 11, 13, 14 onto the ignitable arc gap 12, which then generates the auxiliary short circuit between the phases 6 or at least two phases 6 due to the ignition of the arc. In the event of a short circuit of this type, the short-circuit current of the main current path actually leading into the three-phase load 1 thus commutates to the produced arc of the arc gap 12, such that the short-circuit current, as a result of the "bypass" thus created, no longer loads the subsequent switchgear 7 and the three-phase load 1, and therefore the switchgear 7 and the three-phase load 1 cannot sustain any damage.

Figure 3:
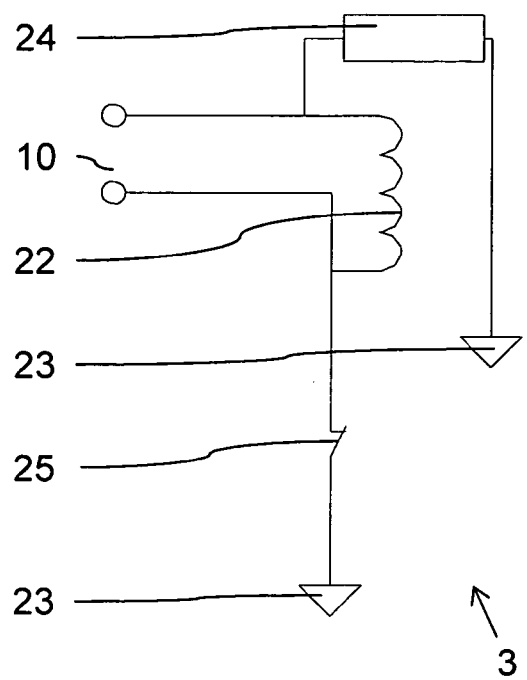
FIG. 3 shows a schematic view of a means according to the invention for generating an ignition pulse.

FIG. 3 illustrates an exemplary embodiment of the means for generating the ignition pulse 3. A coil 22 in which a voltage is induced via an auxiliary voltage source 23 is provided. A current is thus driven through the coil 22 as a result of the resistor 24. Due to an interruption of the current, in the present case by a controllable semiconductor switch 25, such as a transistor, the voltage induced in the coil 22 can be applied as ignition energy via the ignition input 10 to the means for producing the auxiliary short circuit 4 in order to ignite the means for producing the auxiliary short circuit 4.

Figure 4:
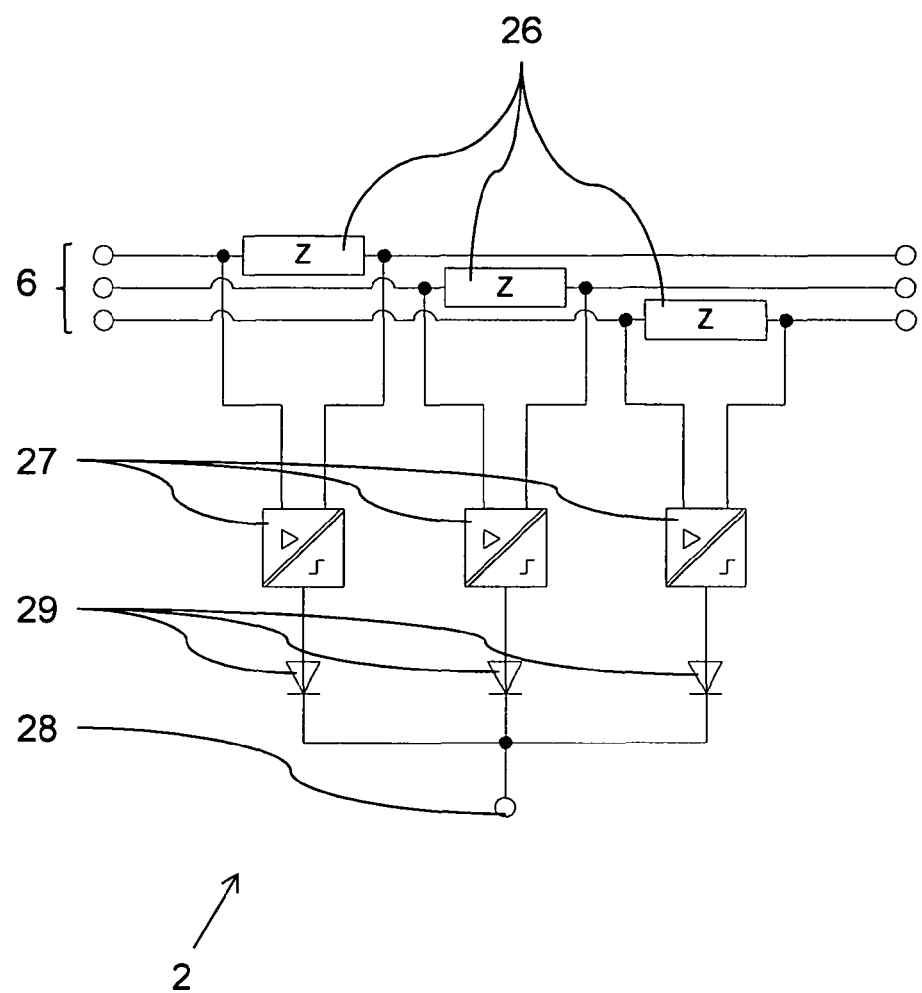
FIG. 4 shows a schematic view of a means according to the invention for identifying a short circuit.

FIG. 4 shows an exemplary embodiment of the means for identifying the short circuit 2 at the three-phase load 1. The means 2 comprises a current sensor 26, which for example is formed as a shunt resistor, as a PTC, as a Hall sensor or as a Rogowski coil, and is provided in the current path of a phase 6. The means 2 further comprises a means for identifying a switching threshold 27, which, when a predefined switching threshold, for example ten times to twenty times the nominal current of the three-phase load 1, is exceeded identifies a short circuit and signals the identified short circuit to the means for generating the ignition pulse 3, indicated by reference sign 28. As also can be seen from FIG. 4, each phase 6 comprises a current sensor and an associated means for identifying the switching threshold 27, wherein the three means 27, via an OR link 29, in the present case formed via diodes, signal to the means for generating the ignition pulse 3 the fact that the switching threshold has been exceeded, even if a short-circuit current has only been identified at one phase 6.

LIST OF REFERENCE SIGNS three-phase load 1
means for identifying a short circuit 2
means for generating an ignition pulse 3
means for producing an auxiliary short circuit 4
three-phase network 5
phase 6
switchgear 7
short-circuit protection device 8
fuse 9
ignition input 10
coupling element 11
arc gap 12
first coupling element 13
second coupling element 14
first embodiment 15
second embodiment 16
star point 17
third embodiment 18
earthed star point 19
fourth embodiment 20
motor 21
coil 22
auxiliary voltage source 23
resistor 24
semiconductor switch 25
current sensor 26
means for identifying a switching threshold 27
signalling 28
OR link 29

The invention claimed is:

1. An apparatus for the short-circuit protection of a three-phase load in a three-phase system, said apparatus comprising:
an input for connection of the apparatus to a three-phase network;
an output for connection of the three-phase load to the apparatus;
a means for producing an auxiliary short circuit in the three-phase network by ignition of the means;
a means for identifying a short circuit at the three-phase load, wherein the means for identifying the short circuit comprises a current sensor and a means for identifying a switching threshold comprised of a galvanic isolation device; and
a means for generating an ignition pulse upon identification of the short circuit,
wherein the means for producing the auxiliary short circuit and the means for identifying the short circuit are provided in the current path between the input and the output,
wherein the means for producing the auxiliary short circuit is ignitable by the ignition pulse,
wherein the current sensor is arranged in the current path of a phase of the three-phase network,
wherein the means for identifying the switching threshold cooperates with the current sensor, and
wherein the means for identifying the switching threshold signals the identification of a short circuit to the means for generating the ignition pulse if a predefined switching threshold is exceeded.

2. The apparatus according to claim 1, wherein the means for producing the auxiliary short circuit comprises an ignition input, a coupling element and an ignitable arc gap, wherein the ignition input, the coupling element and the arc gap are arranged so that an ignition voltage in the form of an ignition pulse is applied to the ignition input via the coupling element on the arc gap to ignite an arc gap, and wherein the arc gap is arranged so that the auxiliary short circuit is produced by the arc gap between at least two phases of the three-phase network.

3. The apparatus according to claim 2, wherein the coupling element is a varistor, a capacitor or both, and the arc gap is a surge protector, a spark gap or both.

4. The apparatus according to claim 3,
wherein each phase of the three-phase network has a first coupling element and a second coupling element and one arc gap,
wherein the first coupling element of each phase is connected between the phase and the ignition input such that all of the first coupling elements are connected together at the ignition input in a star-shaped manner,
wherein a second coupling element of each phase is connected between an input assigned to the phase for ignition of the arc gap, and to the ignition input such that all of the second coupling elements are connected together at the ignition input in a star-shaped manner,
and wherein the arc gap between its respective phase and another phase or a ground is connected such that an ignition voltage applied to the ignition input drops between the first coupling elements connected in the star-shaped manner and the second coupling elements connected in the star-shaped manner.

5. The apparatus according to claim 1, wherein each phase of the three-phase network comprises a current sensor and a means for identifying a switching threshold, and all means for identifying a switching thresholds are connected together on the output side via an OR link and arranged so as to signal the identification of a short circuit to the means for generating the ignition pulse if the switching threshold is exceeded at just one phase.

6. The apparatus according to claim 1, wherein the means for generating the ignition pulse comprises a coil, and wherein the coil is switchably connected to an energy source such that the ignition pulse is generated by interrupting the application of energy to the coil.

7. A semiconductor switchgear protection device, comprising:
an apparatus according to claim 1; and
a semiconductor switching device,
wherein the semiconductor switching device is arranged at the output of the apparatus and is designed for connection to the three-phase load.

8. The apparatus according to claim 1, wherein the means for generating the ignition pulse is formed in such a way that the ignition pulse can be generated by a short-circuit current established by the means for identifying the short circuit.

9. A method for improving the short-circuit protection of a three-phase load in a three-phase system, said method comprising:
a) identifying a short circuit at the three-phase load;
b) generating an ignition pulse upon identification of the short circuit; and
c) generating an auxiliary short circuit in the three-phase system by a means ignited by the ignition pulse.

* * * * *